(12) United States Patent
MacKnight et al.

(10) Patent No.: US 6,649,027 B1
(45) Date of Patent: Nov. 18, 2003

(54) WATER RECLAMATION SYSTEM

(75) Inventors: Allen Kent MacKnight, Lakewood, CA (US); Alex M. Lubman, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/520,298

(22) Filed: Mar. 7, 2000

(51) Int. Cl.⁷ .............. B01D 3/10; B01D 9/00; C02F 1/04
(52) U.S. Cl. ............. 203/11; 203/2; 203/12; 203/91; 203/48; 203/98; 23/295; 23/303; 159/45; 159/47.3; 210/664; 210/713; 210/774; 210/805; 210/808
(58) Field of Search .................. 203/1, 10, 11, 203/48, 12, 100, 91, 98, 2, 3; 23/303, 296, 295; 423/499.4; 159/45, 47.3; 210/664, 713, 774, 808, 805

(56) References Cited

U.S. PATENT DOCUMENTS

| | | | |
|---|---|---|---|
| 3,586,090 A | * 6/1971 | Henderson | 159/49 |
| 3,977,835 A | 8/1976 | Chemtob et al. | |
| 4,180,547 A | * 12/1979 | Chirico | 23/302 T |
| 4,276,117 A | * 6/1981 | Geesen | 159/47.1 |
| 4,547,197 A | 10/1985 | Winkler | |
| 5,160,636 A | * 11/1992 | Gilles et al. | 210/763 |
| 5,783,084 A | * 7/1998 | Suenkonis | 159/47.3 |
| 5,984,981 A | * 11/1999 | Miyagi | 23/303 |
| 5,993,608 A | * 11/1999 | Abry et al. | 159/48.1 |
| 6,500,216 B1 | * 12/2002 | Takayasu | 23/303 |

* cited by examiner

Primary Examiner—Virginia Manoharan
(74) Attorney, Agent, or Firm—Oral Caglar, Esq.

(57) ABSTRACT

A water reclamation system for a closed environment includes a mixer that receives brine. A processor is downstream of the mixer, with the processor distilling substantially salt-free water from the brine in the substantial absence of salt crystallization. A crystallizer subsystem is downstream of the processor, with the crystallizer subsystem crystallizing salt from the brine and recycling the brine to the mixer.

34 Claims, 3 Drawing Sheets

WATER RECLAMATION SYSTEM

BACKGROUND OF THE INVENTION

The present invention generally relates to apparatus and methods for the processing of wastewater and, more specifically, to an improved salt crystallizer system that permits the recovery of essentially 100% of water and that is suitable in a microgravity environment.

In both terrestrial and non-terrestrial closed environments, wastewater may require processing as a result of a limited water supply. In the context of outer space, the amount of water that must be carried on a space flight represents a potential for additional weight. While more water can lead to a longer mission, there is greater fuel cost for the additional weight. In order to minimize the amount of needed water, wastewater can be processed to useable water. To remove organic compounds from the wastewater, bioreactors or bioprocessors have utilized aerobic and/or anaerobic processes. However, even though bioreactors remove the organic compounds, inorganic compounds, such as salts, remain in the wastewater. These, too, must be removed in order to make the wastewater useable.

Although not necessarily used in outer space, salt crystallizers have been devised to recover salts. For example, in U.S. Pat. No. 3,977,835, it was noted that existing processes only separate efficiently portions of the contained salt and result in the loss of desired salts. The inventive process was directed towards recovering salts rich in potassium. This was accomplished by first cooling the brine to crystallize mirabilite. The brine was then evaporated in a first solar evaporator to crystallize out sodium salts that are free of potassium salts. Next, the brine was evaporated in a second solar evaporator to crystallize a group of salts rich in potassium. While the process may be useful to recover particular salts, it does require multiple steps. And it may not likely provide the ability to discard or remove salts and allow recovery of about 100% water.

U.S. Pat. No. 4,547,197 discloses a process for recovering sodium chloride from brine. The process includes removing excess secondary salts from the brine by evaporation and then re-evaporating the brine without disturbing the balance of the secondary salts. Doing so allows a maximum amount of the sodium chloride to be recovered. More specifically, in the initial evaporation, in order to prevent the crystallization of higher solubility components with the sodium chloride, the concentrations of such components are controlled to remain below their saturation. A major part of the sodium chloride is extracted as a crystallized product and water is extracted as steam. The brine then undergoes flash evaporation to further crystallize out sodium chloride and other salts. Thereafter, the mixture of salts, including sodium chloride, are dissolved in water and returned to mix with additional brine at the initial step of evaporation. As can be seen, crystallization occurs in multiple steps, leading to a more complex design. Also, water is not being recovered, but rather discarded.

As can be seen, there is a need for an apparatus and method for removing salts from wastewater and recovering water. Also needed is an apparatus and method for removing salts from wastewater in a fashion that is simple yet efficient. A further need is for an apparatus and method that recovers almost 100% water from wastewater. An additional need is to remove salts from wastewater in a closed environment and in a microgravity environment.

SUMMARY OF THE INVENTION

In one aspect of the present invention, a water reclamation system for a closed environment comprises: a mixer that receives a brine; a processor downstream of the mixer, with the processor distilling water from the brine and; a crystallizer subsystem downstream of the processor, with the crystallizer subsystem crystallizing salt from the brine and recycling the brine to the mixer.

In another aspect of the present invention, a method of reclaiming water in a closed environment comprises: mixing in a mixer an input brine with a recycle brine; distilling in a processor a substantially salt-free water from the input brine, with the processor being disposed downstream of the mixer; crystallizing in a crystallizer subsystem a salt from the input brine, with the subsystem being disposed downstream of the processor; and flowing the recycle brine from the crystallizer subsystem to the mixer.

These and other features, aspects and advantages of the present invention will become better understood with reference to the following drawings, description and claims.

DETAILED DESCRIPTION OF THE INVENTION

While the present invention is described in the context of a closed environment, the scope of the invention also includes an open environment. Further, and even though the present invention has particular application in outer space, the present invention can also be practiced in terrestrial applications.

Figure 1:
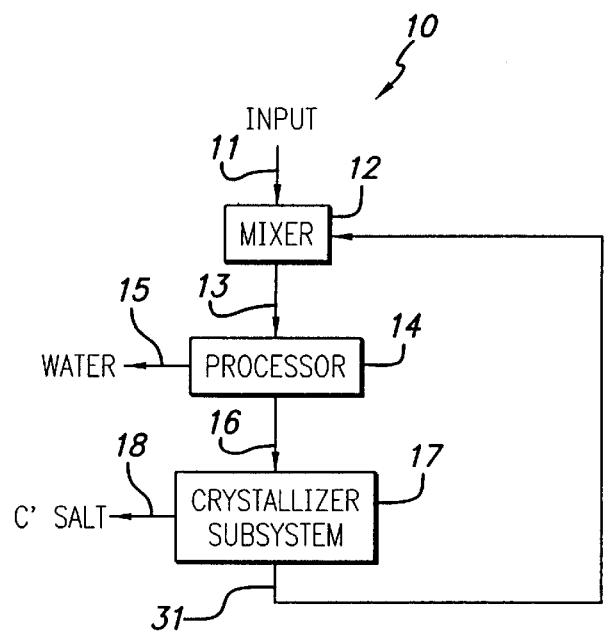
FIG. 1 is a schematic diagram of a water reclamation system according to one embodiment of the present invention.

FIG. 1 is a schematic diagram of a water reclamation system 10 and the acts for reclaiming water according to one embodiment of the present invention. As an example, the reclamation system 10 can be used in the closed environment of a spacecraft in order to process wastewater, such as urine. Typically, the water reclamation system 10 is utilized downstream of a bioprocessor that has removed organic compounds from the wastewater. Generally, the reclamation system 10 includes a mixer 12, a downstream processor 14, and a downstream crystallizer subsystem 17.

Initially, an input flow of brine or wastewater 11 is flowed into the mixer 12. While the following characteristics of the brine 11 can vary, the brine 11 may typically be characterized as having a salt concentration between about 1 to 5% and a flow rate between about 10 to 170 liters/day. In other systems 10, the flow rate can vary from about 3 to 200. In the mixer 12, the input flow 11 is mixed with a recycle brine flow 31 further described below. The mixer 12 can be of any well known design for mixing fluids, such as a tank with a rotating blade, a fluid shear mechanism, a magnetic stirrer, or a tank with baffles.

From the mixer 12, a flow 13 exits. The flow 13 can, for example, be characterized by a salt concentration between about 1 to 10% and a flow rate between about 10.6 to 180 liters/day. The flow 13 then moves into a processor 14 where the flow 13 undergoes a distillation process in the substantial absence of salt crystallization. To achieve the desired distillation in the absence of crystallization, the processor 14 can be of various well-known designs, such as a multistage vacuum rotary distiller, a vapor compression distiller, or a thermoelectric membrane distiller. In the case where the processor 14 is a multistage vacuum rotary distiller, the processor 14 may typically operate at about 30 to 45° C. and about 30 to 50 mm Hg.

The processor 14 produces a potable or substantially salt free water output 15. Accordingly, a salt concentration in the water output is preferably between about 0.01 to 0.1 %. The flow rate of the water output 15 can vary, of course, but is typically in the range of about 9 to 180 kg/day. Also produced by the processor 14 is a flow 16 that can typically be characterized by a salt concentration between about 30 to 55%, a flow rate between about 0.1 to 2.0 liters/day, and a flow temperature between about 40 to 55° C. The flow 16 then enters the crystallizer subsystem 17.

Figure 2:
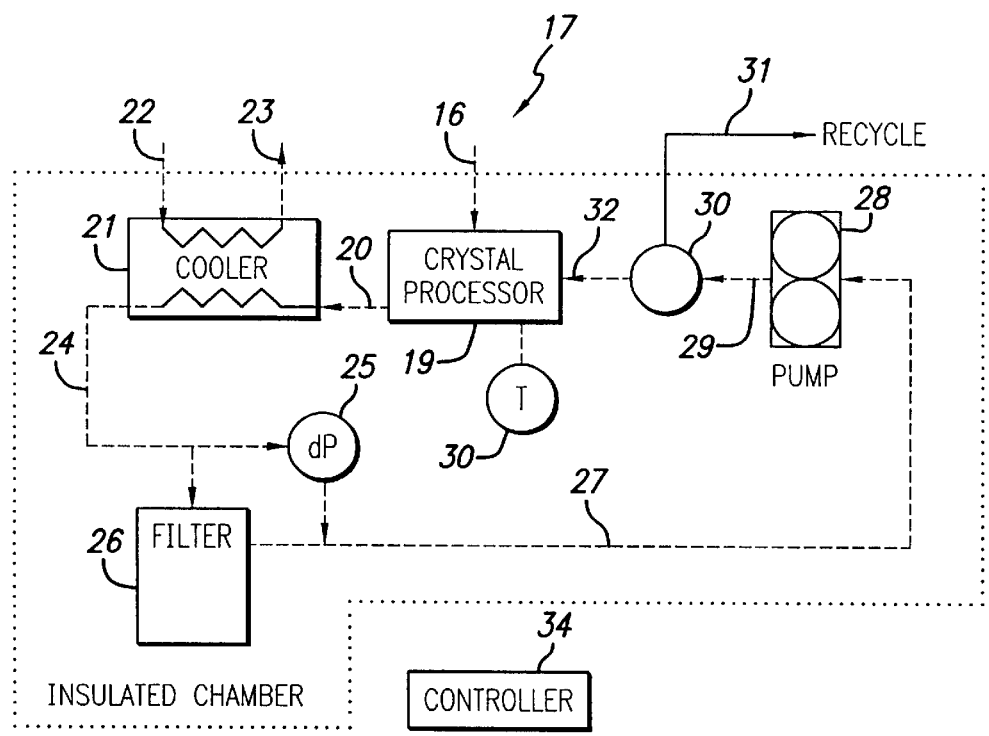
FIG. 2 is a schematic diagram of a closed loop crystallizer subsystem according to one embodiment of the present invention and that can be used in the water reclamation system of FIG. 1.

As with the other aspects of the present invention, the crystallizer subsystem 17 can be of various embodiments. A closed loop embodiment that can be used in a batch mode is shown in FIG. 2 wherein the flow 16 first moves into a crystal processor 19. The crystal processor 19 forms the salt crystals at a rate dependent on the temperature and flow rate passing through the crystal processor. Consequently, the crystal processor 19 can be of various designs, such as a stirred or a baffled design. From the crystal processor 19, a flow 20 moves into a cooler 21. The inflow of a coolant input 22 and the outflow of a coolant output 23 vis-à-vis the cooler 21 cools the flow 20 in order to cause crystallization of the salts. Examples of suitable designs for the cooler 21 include a tubular, plate fin or a prime surface heat exchanger.

A flow 24 exits the cooler 21 and moves to a filter 26. The differential pressure monitor 25 serves to detect the pressure drop across the filter 26. The filter 26 enables the crystallized salt in the flow 24 to be captured, while allowing the brine containing a residual amount of salt to exit the filter 26 as a flow 27. The filter 26 is preferably of a cartridge type design so that upon an accumulation of salt differential pressure across the filter 26, the pressure monitor 25 indicates that the removable cartridge of filter shall be replaced. Useful designs for the filter 26 include pleated paper, fixed media, and spiral wound.

The flow 27 from the filter 26 moves into a pump 28 and exits as a flow 29. The flow 29 then passes into a valve 30 that directs it back to the crystal processor 19 as a flow 32 or to the recycle loop as a flow 31. The recycle flow 31 may typically be characterized with a salt concentration between about 20 to 30% and a flow rate of about 0.1 to 2.0 liters/day. As mentioned above, the recycle flow 31 flows back to the mixer 12 where the recycle flow 31 can mix with a new infusion of the input brine 11.

Figure 3:
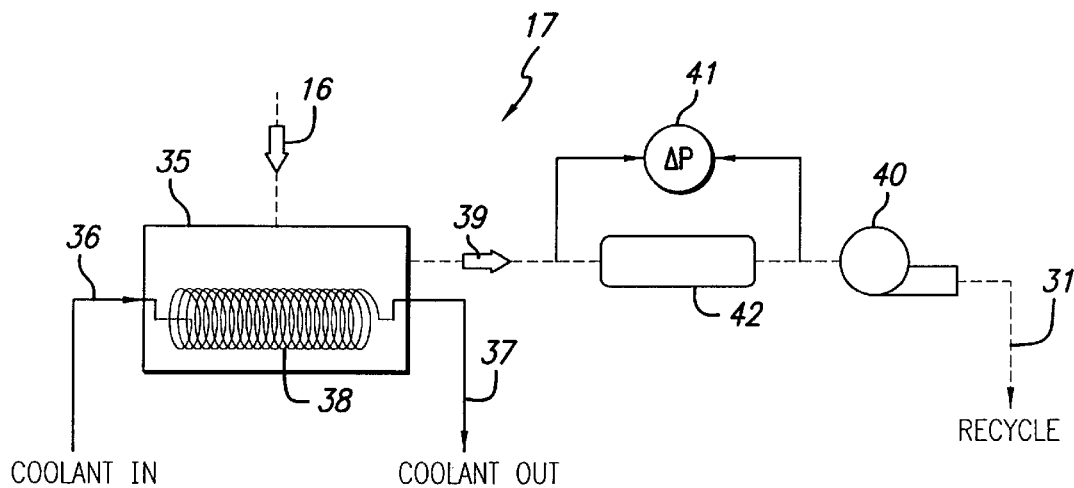
FIG. 3 is a schematic diagram of an open loop crystallizer subsystem according to one embodiment of the present invention and that can be used in the water reclamation system of FIG. 1.

In an open loop embodiment of the crystallizer subsystem 17 (FIG. 3) that allows for continuous processing, a crystal processor 35 receives the flow 16 coming from the processor 14. The crystal processor 35 is cooled by a heat exchanger 38 that operates with a coolant input 36 and a coolant output 37. Thus, the crystal processor 35 functions in a manner similar to the crystal processor 19 (FIG. 2) in the above embodiment to crystallize the undesired salts from the flow 16. A pump 40 produces a flow 39 from the crystal processor 35 to the filter 42. The pressure through the filter 42 is monitored by a differential pressure monitor 41, which is used to determine when the filter needs to be replaced. The recycle brine flow 31 is directed from the crystallizer system 17 to the mixer 12 (FIG. 1).

Figure 4:
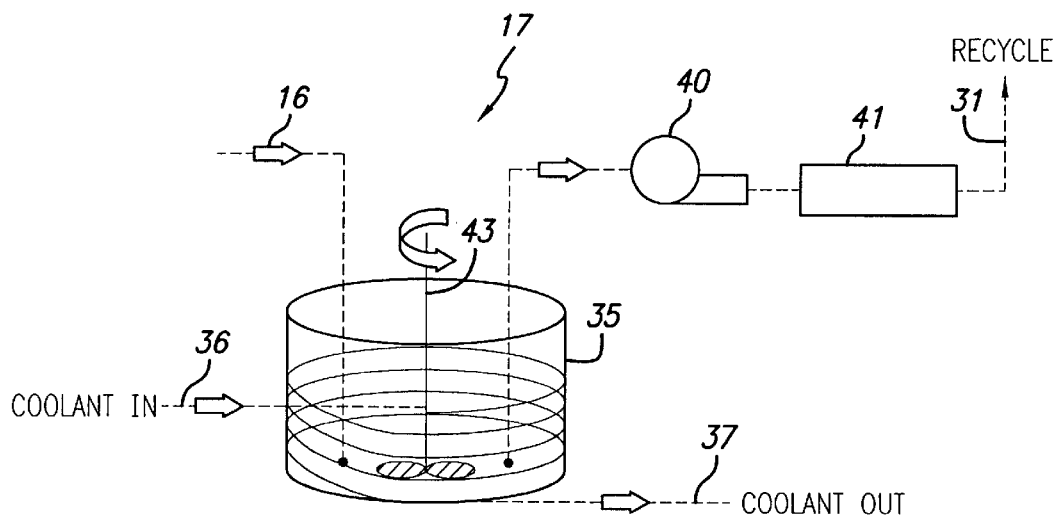
FIG. 4 is a schematic diagram of one variation of the crystallizer subsystem shown in FIG. 3.
Figure 5:
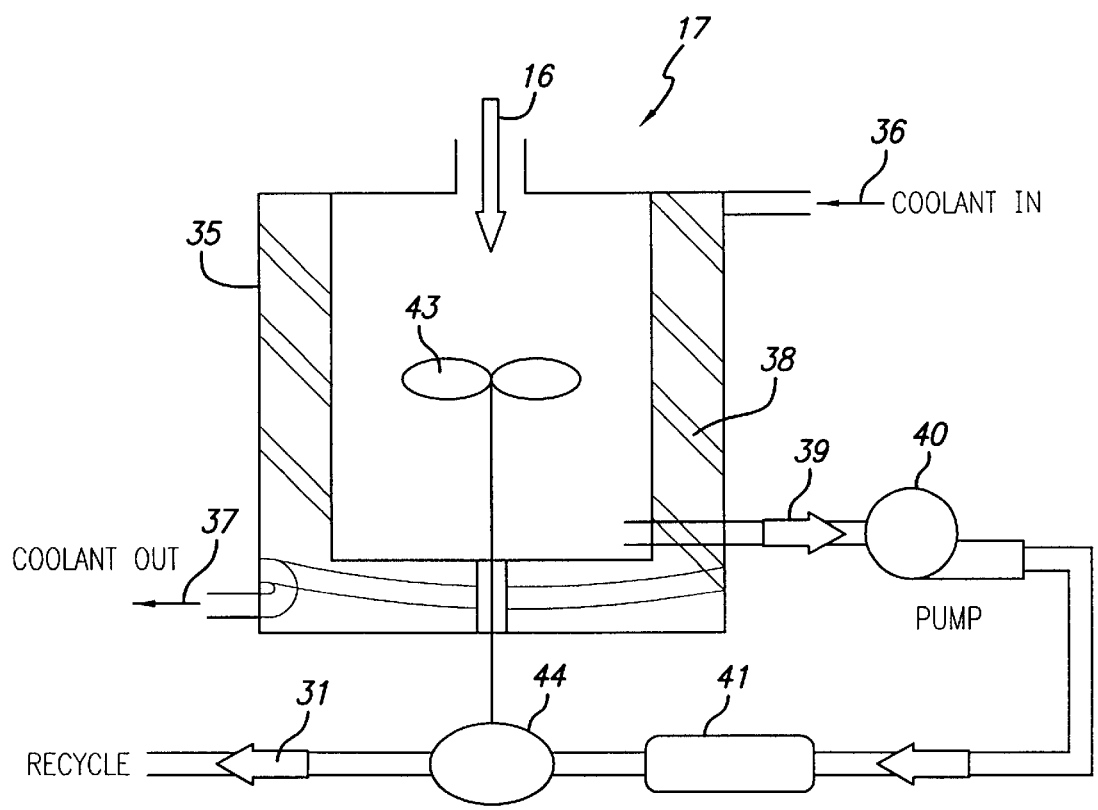
FIG. 5 is a schematic diagram of another variation of the crystallizer subsystem shown in FIG. 3.

In one variation of the open loop crystallizer subsystem 17 (FIG. 4), the heat exchanger 38 is provided internally of the vessel of the crystal processor 35 that holds the flow 16; and the flow 16 is mixed with a mixer 43. In another variation of the open loop crystallizer subsystem (FIG. 5), the heat exchanger 38 is provided externally of the vessel of the crystal processor 35 that holds the flow 16. Further, a hydraulic motor 44 is provided downstream of the filter 41 to enable the motor 44 to run the mixer 43.

In view of the foregoing, it can be seen that the present invention also provides a method of reclaiming water by mixing in the mixer 12 the input brine 11 and the recycle brine 31. Downstream of the mixer 12 is a processor 14 that distills out salts from the input brine 11 and the recycle brine 31. The distillation process occurs in the substantial absence of salt crystallization in order to prevent clogging of the system 10. As a result of the distillation, the processor 14 outputs substantially salt free water 15 for recovery and a flow 16 having a high concentration of salts. The flow 16 moves downstream into a crystallizer subsystem 17 where the temperature of the flow 16 is cooled to cause crystallization of the salts in the flow 16. The crystallized salts are filtered out by the crystallizer subsystem 17 to provide recycle brine 31 that moves back to the mixer 12.

The system 10 will operate in the presence of gravity or without gravity in orbiting spacecraft. The fluids are actively pumped and the water will transport the solid phase (crystals). The viscous forces on the small crystals are high enough to cause them to flow through the subsystem 17. Gravity forces tend to cause separation of the solids due to difference in density. These effects will cause the subsystem 17 not to function by accumulating solids and clogging the tubing if the flow effects on the solids are smaller than gravity effects. Thus, a subsystem 17 that functions in gravity will also function without gravity. There have been numerous experiments by companies such as Rockwell that were conducted in space and which show enhanced crystallization in microgravity as compared to earth gravity. The crystal processor 19 will function in microgravity.

EXAMPLES

Modeling calculations were produced based on the mass balance of the reclamation system 10. The state points of each unit process were determined by setting the crystallizer 17 temperature at 10° C. and assuming the salt was sodium chloride. The solubility of salt in the recycle loop 31 was determined from solubility tables in the CRC Chemistry Handbook (78-ty Edition 1997–1998). The secondary water processor 14 was assumed to operate at 40° C. The solubility of salt at this temperature established the concentration of salt entering the crystallizer 17. The concentration of salt in the input brine 11 is an independent variable. A value of 1% concentration models the effluent from a bioprocessor or seawater. A value of 5% concentration models urine. The input flow rate is also an independent variable.

The amount of water collected on the crystallized salt is also an independent variable. Parametric variation of this parameter shows that it has little affect on the recovery of water over the expected ranges.

The provided analysis and supported calculations show that the system will recover 99.9 and 99.4% of the input water depending on whether the input is 1% or 5% salt concentration. The amounts of recycled brine 31 needed to balance the system for maximum water recovery are 1.2 and 6%, respectively, based on the input flow rate.

As can be appreciated by those skilled in the art, the present invention provides an apparatus and method for removing salts from wastewater and recovering water. An apparatus and method for removing salts from wastewater in a fashion that is simple yet efficient is also provided by the present invention. The present invention further recovers almost 100% water from wastewater. Additionally, the present invention can remove salts from wastewater in a closed environment and in a microgravity environment.

It should be understood, of course, that the foregoing relates to preferred embodiments of the invention and that modifications may be made without departing from the spirit and scope of the invention as set forth in the following claims.

We claim:

1. A method of reclaiming water, comprising:
    mixing in a mixer input brine with recycle brine;
    outputting a mixture from the mixer to a processor;
    outputting from said processor substantially salt-free water from the mix of input brine and recycle brine, said processor being disposed downstream of said mixer, and wherein the step of outputting a substantially salt-free water occurs in the substantial absence of salt crystallization in said processor;
    outputting from the processor a flow having a high concentration of salts to a crystallizer subsystem;
    outputting from the crystallizer subsystem a salt, said subsystem being disposed downstream of said processor; and
    flowing said recycle brine from said crystallizer subsystem to said mixer;
    wherein the crystallizer subsystem includes a crystal processor and the method further comprising the steps of:
        outputting a salt concentration from the crystal processor into a cooler wherein said cooler cools the salt concentration;
        forming a crystallized salt from the salt concentration;
        inputting the recycle brine into a filter;
        capturing the crystallized salt in a the filter;
        allowing the recycle brine to exit the filter;
        inputting the recycle brine into a pump;
        outputting the recycle brine from the pump into a valve; and
        directing an output from the valve into the crystal processor and the mixer.

2. The method of claim 1, further comprising the step of distilling water from said input brine, the step of distilling occurring in said processor.

3. The method of claim 2, wherein said processor is selected from a group consisting of a multistage vacuum rotary distiller, a vapor compression distiller and a thermoelectric membrane distiller.

4. The method of claim 2, further comprising the step of altering a temperature of said flow, the step of altering occurring in said crystallizer subsystem.

5. The method of claim 1, wherein said processor is a multistage vacuum rotary distiller which operates at about 30° to 45° C. and at about 30 to 50 mm Hg.

6. The method of claim 1, wherein said step of outputting from the a processor outputs substantially salt-free water at a rate of about 9 to 180 kg/day.

7. The method of claim 1, wherein the crystallizer subsystem is selected from a group consisting of a stirred design and a baffled design.

8. The method of claim 1, wherein said filter is a cartridge design.

9. The method of claim 8, wherein upon an accumulation of a salt differential pressure across the filter a pressure monitor indicates that the cartridge of the filter should be replaced.

10. The method of claim 8, wherein the filter is selected from a group consisting of a pleated paper, a fixed media and a spiral wound.

11. A method of reclaiming water, comprising:
    mixing in a mixer input brine with recycle brine;
    outputting a mixture from the mixer to a processor;
    outputting from said processor substantially salt-free water from the mix of the input brine and the recycle brine, said processor being disposed downstream of said mixer, and wherein the step of outputting a substantially salt-free water occurs in the substantial absence of salt crystallization in said processor;
    outputting from the processor a flow having a high concentration of salts to a crystallizer subsystem;
    outputting from the crystallizer subsystem a salt, said subsystem being disposed downstream of said processor; and
    flowing said recycle brine from said crystallizer subsystem to said mixer,
    wherein the crystallizer subsystem includes a crystal processor and the method further comprising the steps of:
        inputting the output from the processor into the crystal processor where the output from the crystal processor is a salt concentration
        cooling the crystal processor with a heat exchanger;
        forming a crystallized salt from the salt concentration;
        inputting the recycle brine into a filter;
        capturing the crystallized salt In a the filter;
        allowing the recycle brine to exit the filter;
        inputting the recycle brine into a pump; and
        directing the recycle brine from the pump into the mixer.

12. The method of claim 11, wherein said step of outputting from the processor outputs the flow at a rate of about 0.1 to 2.0 liters/day.

13. The method of claim 11, wherein said step of outputting from a processor outputs the flow at a temperature of about 40° to 55° C.

14. The method of claim 11, wherein said step of flowing said recycle brine flows at a rate of about 0.1 to 2.0 liters/day.

15. The method of claim 11, further comprising the step of: monitoring the pressure through the filter with a differential pressure monitor which determines when the filter needs replacing.

16. A method of reclaiming water in a closed environment, comprising the steps of:
    mixing in a mixer input brine with recycle brine;
    feeding an output mix of said brine and recycle brine to a processor;
    distilling said output mix in said processor to yield a substantially salt-free water from the mix of said input brine and recycle brine, said processor being disposed downstream of said mixer wherein the step of distilling said output mix occurs in the substantial absence of salt crystallization in said processor;
    feeding said recycle brine from said processor to a crystallizer subsystem;

crystallizing in said crystallizer subsystem a salt from said input brine, said subsystem being disposed downstream of said processor; and flowing said recycle brine from said crystallizer subsystem to said mixer, wherein the crystallizer subsystem includes a crystal processor and the method further comprising the steps of:

outputting a salt concentration from the crystal processor into a cooler wherein said cooler cools the salt concentration;

forming a crystallized salt from the salt concentration;

inputting the recycle brine into a filter;

capturing the crystallized salt in a the filter;

allowing the recycle brine to exit the filter;

inputting the recycle brine into a pump;

outputting the recycle brine from the pump into a valve; and directing an output from the valve into the crystal processor and the mixer.

17. The method of claim 16, wherein said processor is selected from a group consisting of a multistage vacuum rotary distiller, a vapor compression distiller and a thermoelectric membrane distiller.

18. The method of claim 16, further comprising the step of outputting from said processor said salt-free water.

19. The method of claim 16, further comprising the step of outputting from said crystallizer subsystem said salt.

20. The method of claim 16, further comprising the step of inputting said input brine in the mixer at a rate of about 3 to 200 liters/day.

21. The method of claim 16, wherein said input brine has a salt concentration of about 1% to 5%.

22. The method of claim 16, wherein said recycle brine has a salt concentration of about 20% to 30%.

23. The method of claim 16, wherein said substantially salt-free water has a salt concentration of about 0.01% to 0.1%.

24. The method of claim 16, wherein said processor is a multistage vacuum rotary distiller which operates at about 30° to 45° C. and at about 30 to 50 mm Hg.

25. The method of claim 16, wherein said step of outputting from a processor outputs water at a rate of about 9 to 180 kg/day.

26. The method of claim 16, wherein said step of outputting from a processor outputs the flow at a rate of about 0.1 to 2.0 liters/day.

27. The method of claim 16, wherein said step of outputting from a processor outputs the flow at a temperature of about 40° to 55° C.

28. The method of claim 16, wherein step of flowing said recycle brine flew flows at a rate of about 0.1 to 2.0 liters/day.

29. The method of claim 16, wherein the crystallizer subsystem is selected from a group consisting of a stirred design and a baffled design.

30. The method of claim 16, wherein said filter is a cartridge design.

31. The method of claim 30, wherein upon an accumulation of a salt differential pressure across the filter a pressure monitor indicates that the cartridge of the filter should be replaced.

32. The method of claim 30, wherein the filter is selected from a group consisting of a pleated paper, a fixed media and a spiral wound.

33. A method of reclaiming water in a closed environment, comprising the steps of:

mixing in a mixer input brine with recycle brine;

feeding an output mix of said brine and recycle brine to a processor;

distilling said output mix in said processor to yield a substantially salt-free water from the mix of said input brine and recycle brine, said processor being disposed downstream of said mixer, wherein the step of distilling said output mix occurs in the substantial absence of salt crystallization in said processor;

feeding said recycle brine from said processor to a crystallizer subsystem;

crystallizing in said crystallizer subsystem a salt from said input brine, said subsystem being disposed downstream of said processor; and flowing said recycle brine from said crystallizer subsystem to said mixer, wherein the crystallizer subsystem includes a crystal processor and the method further comprising the steps of:

inputting the output from the processor into the crystal processor where the output from the processor Is a salt concentration;

cooling the crystal processor with a heat exchanger;

forming a crystallized salt from the salt concentration;

inputting the recycle brine into a filter;

capturing the crystallized salt in the a filter;

allowing the recycle brine to exit the filter;

inputting the recycle brine into a pump; and directing the recycle brine from the pump into the mixer.

34. The method of claim 33, further comprising the step of: monitoring the pressure through the filter with a differential pressure monitor which determines when the filter needs replacing.

* * * * *